United States Patent
Klingström

(10) Patent No.: US 10,152,122 B2
(45) Date of Patent: Dec. 11, 2018

(54) FOVEATED RENDERING

(71) Applicant: Tobii AB, Danderyd (SE)

(72) Inventor: Andreas Klingström, Danderyd (SE)

(73) Assignee: Tobii AB, Danderyd (SE)

( * ) Notice: Subject to any disclaimer, the term of this patent is extended or adjusted under 35 U.S.C. 154(b) by 68 days.

(21) Appl. No.: 15/212,889

(22) Filed: Jul. 18, 2016

(65) Prior Publication Data

US 2018/0018018 A1    Jan. 18, 2018

(51) Int. Cl.
*G06F 3/01* (2006.01)
*G06T 1/00* (2006.01)
*G06T 3/00* (2006.01)
*G02B 27/01* (2006.01)
*G09G 5/00* (2006.01)

(52) U.S. Cl.
CPC .............. *G06F 3/013* (2013.01); *G02B 27/01* (2013.01); *G09G 5/00* (2013.01); *G02B 2027/0147* (2013.01); *G09G 2320/0261* (2013.01); *G09G 2340/0407* (2013.01)

(58) Field of Classification Search
CPC ..... G09G 2300/0421; G09G 2300/043; G09G 2300/0426; G09G 2320/045
See application file for complete search history.

(56) References Cited

U.S. PATENT DOCUMENTS

| | | | |
|---|---|---|---|
| 6,115,007 A | 9/2000 | Yamazaki | |
| 2003/0206179 A1* | 11/2003 | Deering | G06T 3/0081 345/589 |
| 2004/0227703 A1 | 11/2004 | Lamvik et al. | |
| 2010/0056274 A1 | 3/2010 | Uusitalo et al. | |
| 2010/0200736 A1* | 8/2010 | Laycock | G02B 6/06 250/227.2 |
| 2014/0092006 A1 | 4/2014 | Boelter et al. | |
| 2014/0247277 A1* | 9/2014 | Guenter | G06T 11/00 345/611 |
| 2015/0061995 A1 | 3/2015 | Gustafsson et al. | |
| 2015/0241707 A1 | 8/2015 | Schowengerdt | |
| 2015/0287158 A1* | 10/2015 | Cerny | G06F 3/013 345/553 |
| 2016/0350965 A1* | 12/2016 | Lum | G06T 11/40 |
| 2016/0366365 A1* | 12/2016 | Iyer | G06F 3/013 |

(Continued)

OTHER PUBLICATIONS

Munn, et al., "3D point of regard, position and head orientation from a portable monocular video based eye tracker", ETRA '08 Proceedings of the 2008 symposium on Eye tracking research & applications, Mar. 26-28, 2008, 8 pages.

(Continued)

*Primary Examiner* — William Lu
(74) *Attorney, Agent, or Firm* — Kilpatrick Townsend & Stockton LLP

(57) ABSTRACT

According to the invention, a method for changing a display based on a gaze point of a user on the display is disclosed. The method may include determining a gaze point of a user on a display. The method may also include causing a first area of the display to be displayed in a first manner, the first area including the gaze point and a surrounding area. The method may further include causing a second area of the display to be displayed in a second manner, the second area being different than the first area, and the second manner being different than the first manner.

18 Claims, 10 Drawing Sheets

(56) References Cited

U.S. PATENT DOCUMENTS

2017/0091549 A1* 3/2017 Gustafsson ........ G06K 9/00604
2017/0287446 A1* 10/2017 Young .................... G09G 5/391

OTHER PUBLICATIONS

Paletta, et al., "An integrated system for 3D gaze recovery and semantic analysis of human attention", Computer Vision and Pattern Recognition, Jul. 30, 2013, 4 pages.

* cited by examiner

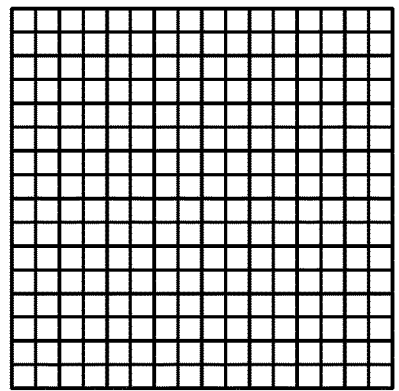
REAL PIXELS
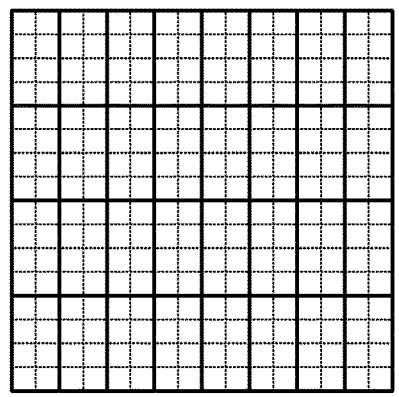
VIRTUAL PIXELS
EACH VIRTUAL PIXEL
INCLUDES EIGHT REAL
PIXELS
OTHER EMBODIMENTS
COULD INCLUDE
FEWER OR GREATER
NUMBER OF PIXELS IN
DIFFERENT
ORIENTATIONS
Fig. 5

FOVEATED RENDERING

BACKGROUND OF THE INVENTION

Graphical items may be used on a display to show data and information to a viewer. These graphical items may include text, images, and video. Graphical items in the area of computing are well known and have been in use for many years. Recently, showing three dimensional (3D) graphical items on a display has increased in importance in areas such as gaming, modeling and movies.

When displaying graphical items, a system such as a computer uses a processor in combination with memory to display the items on a screen or other display device. Methods for displaying graphical items vary, but typically they rely on a computer interpreting commands to control a graphics processing device that provides graphical items for display. The graphics processing device typically contains custom hardware for this purpose including a processor and memory. In some computer systems the graphics processing device is fully integrated, and in others it is provided as a separate component known as a graphics card.

Graphics processing devices have limits on their processing power, usually quantified in terms of the amount of graphical items that can be displayed on a screen at any given time. This is typically limited by the capabilities of the hardware embodying the graphics processing device, including processors, memory, and communication channels. Additionally, the amount of graphical items able to be displayed on a screen at a given point can be limited by communication limits between the graphics processing device and computer.

In many scenarios that require graphical items be displayed on a screen, a user only focuses on a portion of the screen, and therefore only a portion of the graphical items, an any given time. Meanwhile, other graphical items continue to be displayed on the remaining portions of the screen, which the user is not focused on. This wastes valuable graphics processing device resources to produce graphical items that cannot be fully appreciated by the user because the visual acuity of a human drops dramatically outside those images immediately focused on.

BRIEF DESCRIPTION OF THE INVENTION

In one embodiment, a method for changing a display based on a gaze point of a user on the display is provided. The method may include determining a gaze point of a user on a display. The method may also include causing a first area of the display to be displayed in a first manner, the first area including the gaze point and a surrounding area. The method may further include causing a second area of the display to be displayed in a second manner, the second area being different than the first area, and the second manner being different than the first manner.

In another embodiment, a system for changing content on a display based on a gaze point of a user on the display is provided. The system may include an eye tracking device for determining a gaze point of a user on a display and a processor. The processor may be for at least causing a first area of the display to be displayed in a first manner, the first area including the gaze point and a surrounding area. The processor may also be for at least causing a second area of the display to be displayed in a second manner, the second area being different than the first area, and the second manner being different than the first manner.

In another embodiment, a non-transitory machine readable medium having instructions stored thereon for changing content on a display based on a gaze point of a user on the display is provided. The instructions may be executable by one or more processors to at least determine a gaze point of a user on a display and cause a first area of the display to be displayed in a first manner, the first area including the gaze point and a surrounding area. The instructions may also be executable to at least cause a second area of the display to be displayed in a second manner, the second area being different than the first area, and the second manner being different than the first manner.

BRIEF DESCRIPTION OF THE DRAWINGS

The present invention is described in conjunction with the appended figures:

FIG. 5 is a schematic view of virtual versus real pixels which is pertinent to some embodiments of the invention;

Figure 1:
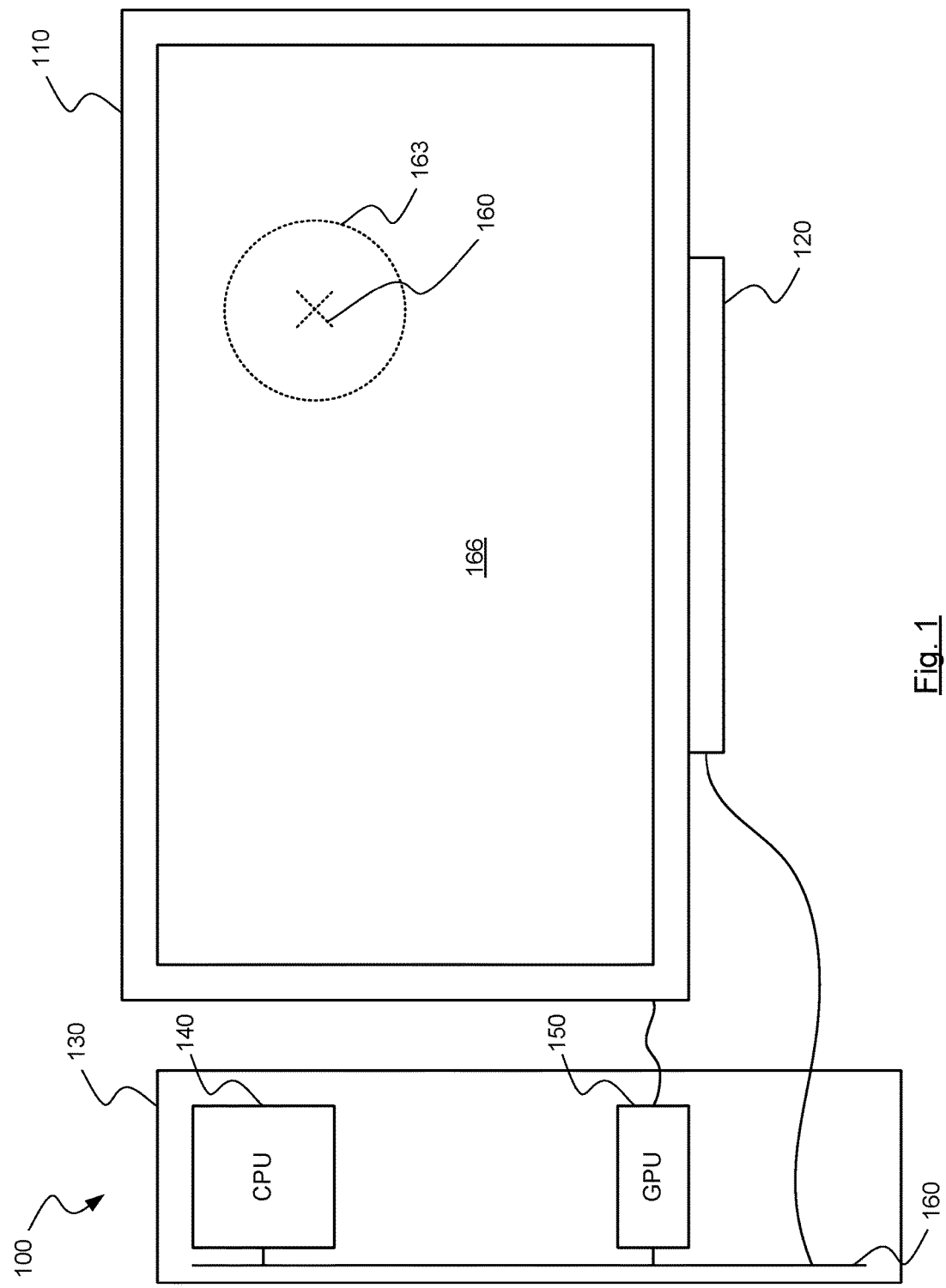
FIG. 1 is an schematic view of one embodiment of the invention for adjusting a display device based on eye tracking.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Turning now to FIG. 1, a system 100 is shown having a display 110 and an eye tracking device 120. A computer 130 is in communication with display 110, and includes a central processing unit (CPU) 140, and graphics processing unit (GPU) 150. Motherboard 160 allows for communication between CPU 140, GPU 150, and eye tracking device 120. Display 110, eye tracking device 120, and computer 130 are merely exemplary in nature for purposes of this disclosure, as other computing devices, displays, and eye tracking devices including various desktop computers, laptop computers, notebook computers, tablets, mobile and cellular devices, wearable devices such a virtual reality headsets and wristwatches/computers, etc. could also embody some or all of the components in FIG. 1. Furthermore, FIG. 5, discussed below, illustrates other possible components present in various embodiments of computer 130.

It has been determined that when a human user is focusing on display 110 at gaze point 160, the user is only able to focus at a high resolution of detail on a first area 163 surrounding gaze point 160. In the surrounding area 166, the resolution at which details can be ascertained by human eyes drops off. Consequently, a lesser amount of computing resources, such as processing power of CPU 140 and GPU 150, can be devoted to rendering that portion of the display. Thus, by employing eye tracking device 120, the position of a user's gaze on display 110 can be determined and used to inform CPU 140 and GPU 150 how to most efficiently render different areas of display 110 to a level of detail which does not exceed what an average user can effectively ascertain, thereby conserving computing resources. First area 163 surrounding gaze point 160 can be dynamic, moving as the gaze point moves, meaning that different portions of display 110

Figure 2:
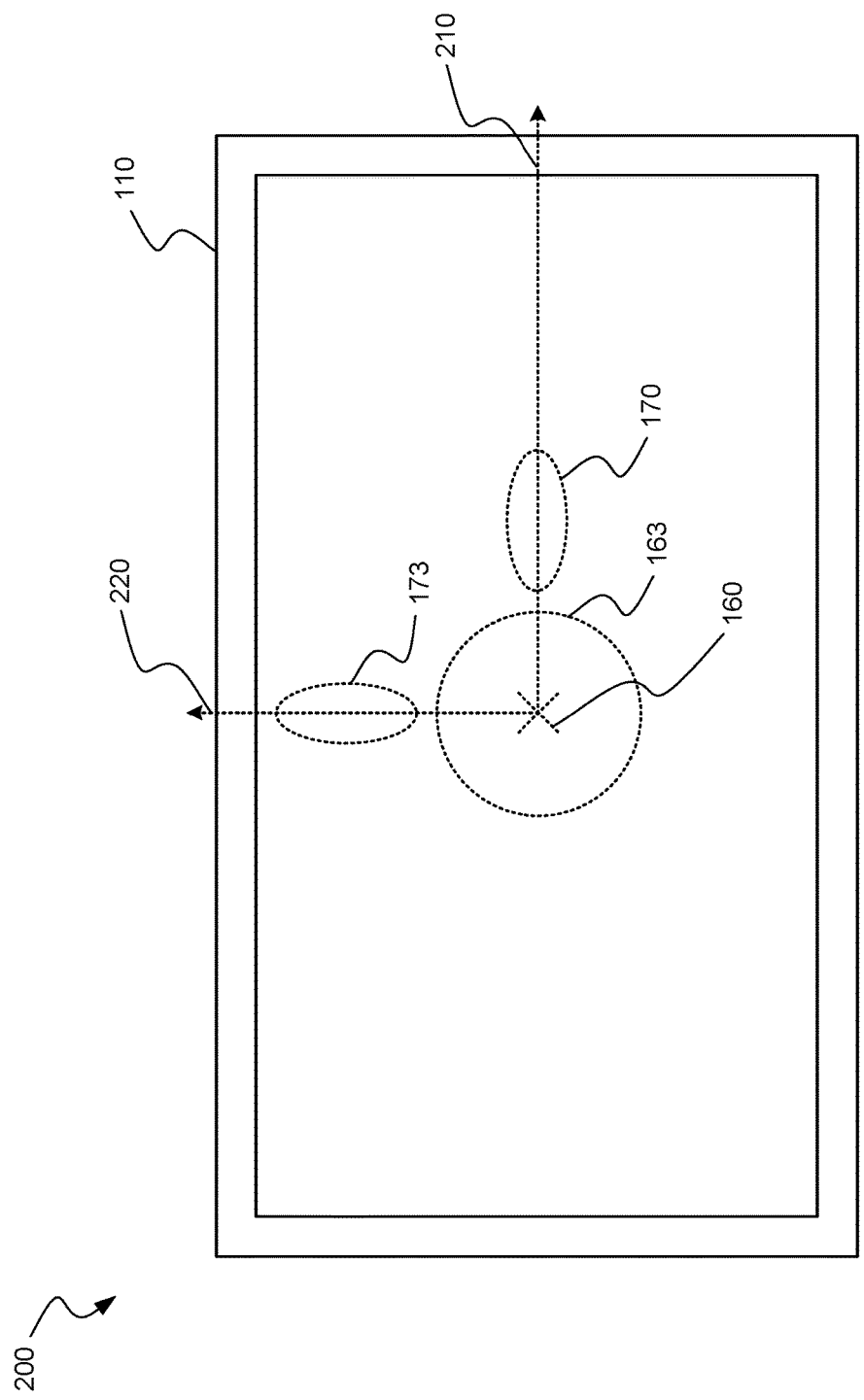
FIG. 2 is a schematic view of a display device demonstrating various aspects of some embodiments of the invention.

Turning to FIG. 2, it has also been determined that resolution perception is greater in the horizontal axis 210 of a gaze point 160 than in the vertical axis 220. Thus, as shown in FIG. 2, resolution perception is greatest within first area 163, immediately surrounding gaze point 160, and less at second area 170, and even less at third area 173.

Figure 3:
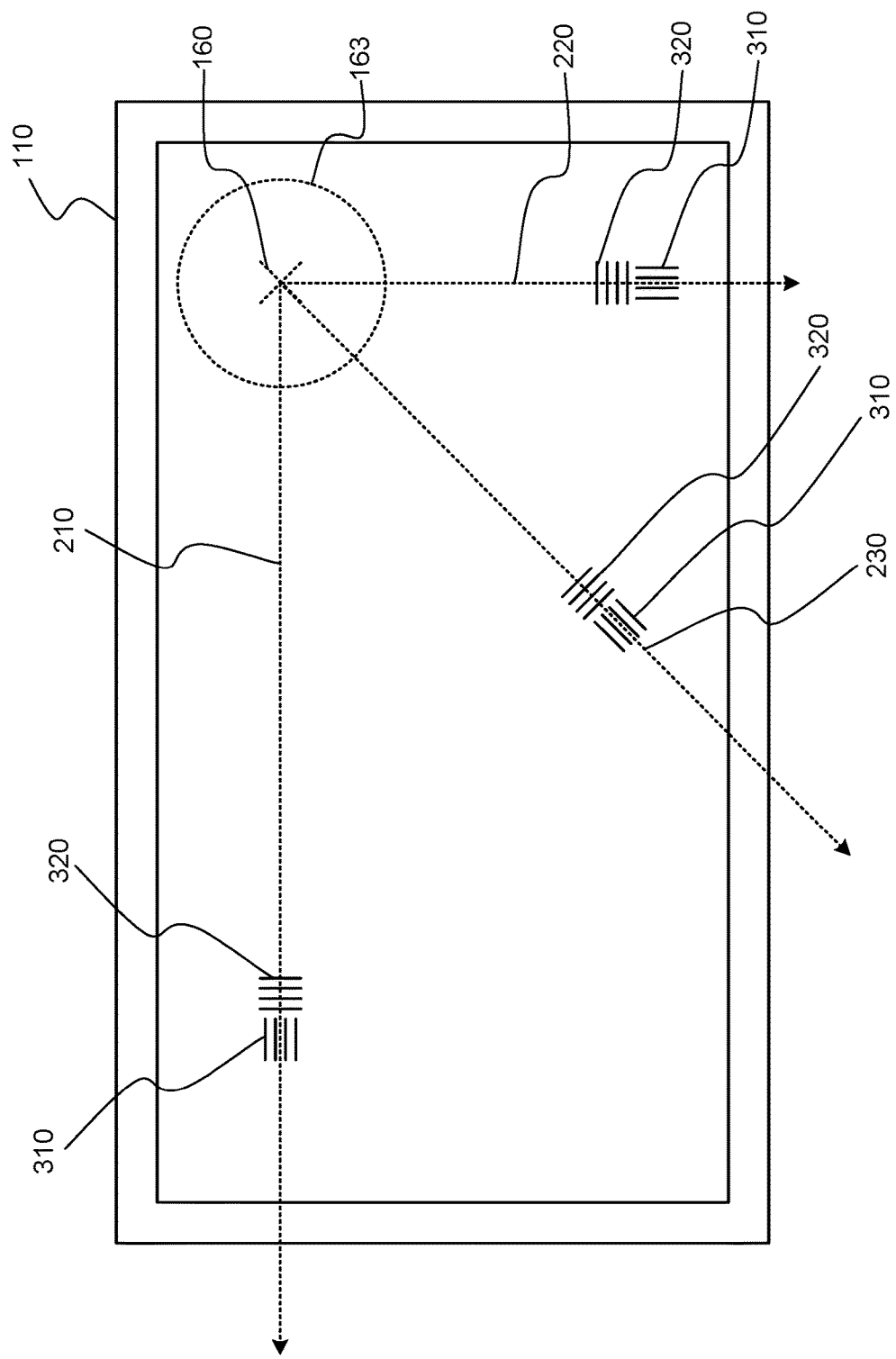
FIG. 3 is another schematic view of a display device demonstrating various aspects of some embodiments of the invention.

Finally, it has also been determined that resolution perception is not consistent direction-wise in the periphery from the gaze point. Turning now to FIG. 3, it will be shown how humans have greater vertical resolution than horizontal resolution along the horizontal axis 210 of their periphery, and greater horizontal resolution than vertical resolution along the vertical axis 220 of their periphery. Humans are better able to see parallel gratings 310 than perpendicular gratings 320 on both the horizontal axis 210 and vertical axis 220. This means that vertical resolution perception is greater along the horizontal axis 210, and horizontal resolution perception is greater along the vertical axis, when at a certain angular distance from gaze point 163. The same effect occurs at other non-cardinal/intermediate axes 230 between the horizontal axis 210 and vertical axis 220.

Figure 4:
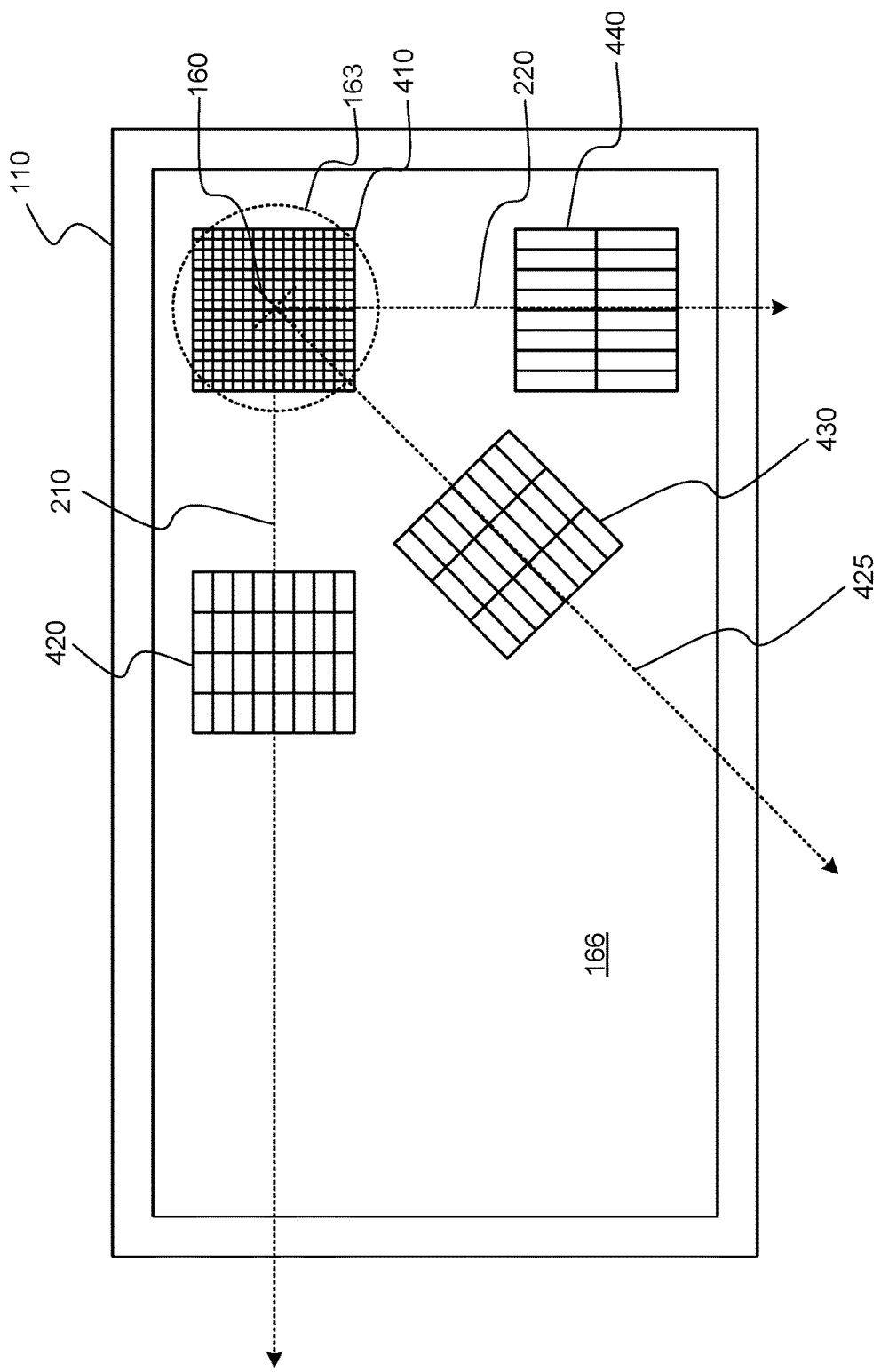
FIG. 4 is another schematic view of a display device demonstrating various aspects of some embodiments of the invention.

Thus, as shown in FIG. 4, the most computing resource effective manner in which to render display 110 would be to (1) render first area 163 at a high resolution 410; (2) render remaining area 166 in an increasingly lower resolution away from first area 163; (3) render areas about horizontal axis 210 in a lower and horizontally orientated rectangular resolution 420; (4) render areas about intermediate axes 230 in a yet lower and a substantially parallel rectangular resolution 430; and (5) render areas about vertical axis 220 in an even yet lower and vertically orientated rectangular resolution 440. Note that with regard to the intermediate axes, the term "substantially parallel" means that for a given axis, the surrounding resolution will be parallel to resolutions which may be close to or exactly parallel to a resolutions lying close to or exactly on the axis.

To render pixels of different sizes, a virtual pixilation scheme may be employed at each location where different size and/or shaped pixels are required. FIG. 5 shows how a virtual pixel could be made up from a number of smaller real pixels. Thus, in a high resolution area, real pixels may be employed, with each real pixel rendered on a potentially independent level to obtain the highest possible image quality. Meanwhile, in a low resolution area, virtual pixels may be employed, with each virtual pixel rendered on a potentially independent level to obtain the minimum image quality necessary for that area (i.e., where higher image quality could not be perceived at the periphery of a user's vision). While each virtual pixel may be comprised on multiple real pixels, all real pixels within a given virtual pixel would be rendered in the same manner to cause the entire given virtual pixel to be rendered as if it was a single pixel.

While the above discussion has focused on modifying the resolution of different areas of the display (i.e., a first area which includes the gaze point, a remainder of the display beyond the first area, a second area which includes a portion of a horizontal axis of the gaze point, a third area which includes a portion of a vertical axis of the gaze point, and a fourth area which includes a portion of an intermediate axis of the gaze point), other visual qualities may also be rendered at lower quality levels in order to accomplish the intention of saving computing resources. Merely by way of example, a reduced quality area of the display could be displayed in (when compared to the quality of a first manner of display in a higher quality area): a decreased resolution from the first manner, a decreased shading quality from the first manner, a decreased shadow quality from the first manner, a decreased reflection rendering quality from the first manner, a decreased texture mapping quality from the first manner, a decreased frame rate from the first manner, a decreased fogging/particulation quality from the first manner, a decreased translucence rendering quality from the first manner, a decreased anti-aliasing quality from the first manner, a decreased frame rate from the first manner, and a decreased three dimensional rendering quality from the first manner. Other manners of decreasing quality of rendering, as known in the art, are also possible.

Figure 6:
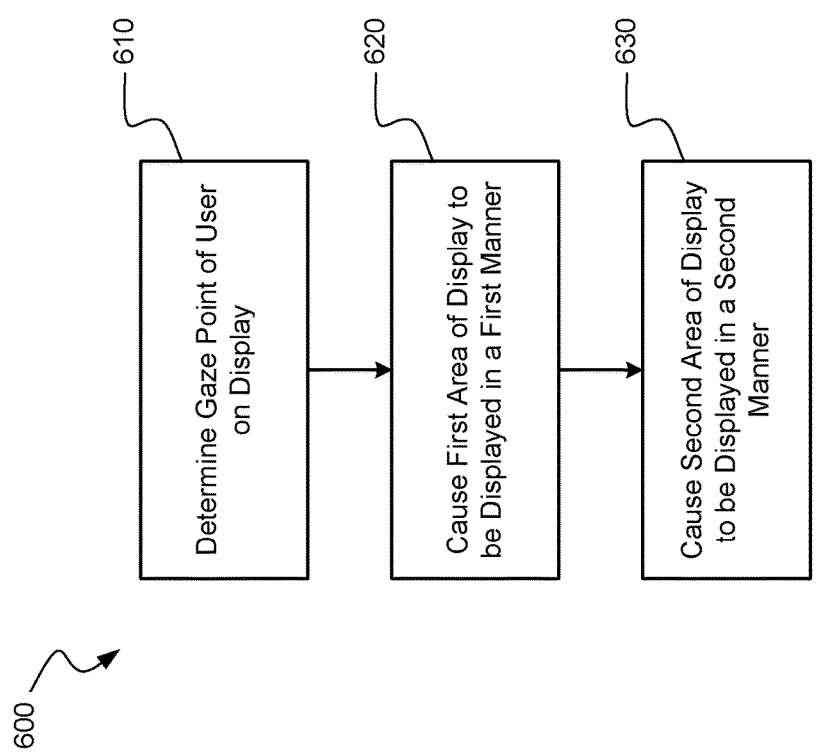
FIG. 6 is a flow diagram of one method of the invention for modifying a display device based on eye tracking.

FIG. 6 is a block diagram of one method 600 of the invention for changing content on a display based on a gaze point of a user. At block 610, the gaze point of the user on the display is determined. At block 620, a first area of the display is displayed in a first manner. The first area of the display includes the gaze point an a surrounding area. The size of the surrounding area may be adjusted based on a distance from the display to the user's eyes, as determined by the eye tracking device and/or processor.

At block 630, a second area of the display (which is different than the first area of the display) is displayed in a second manner, different than the first manner. The second manner is a manner in which the quality of rendering is lessened from the first manner. As discussed above, this could be a lower resolution and/or other quality. In some embodiments the second area could be a remainder of the display besides the first area, while in other embodiments the second area could include a portion of a horizontal axis extending to a left or a right of the gaze point, or a portion of a vertical axis extending above or below the gaze point. The second area could also or alternatively include a portion of an intermediate axis located angularly between the horizontal axis and the vertical axis.

Figure 7:
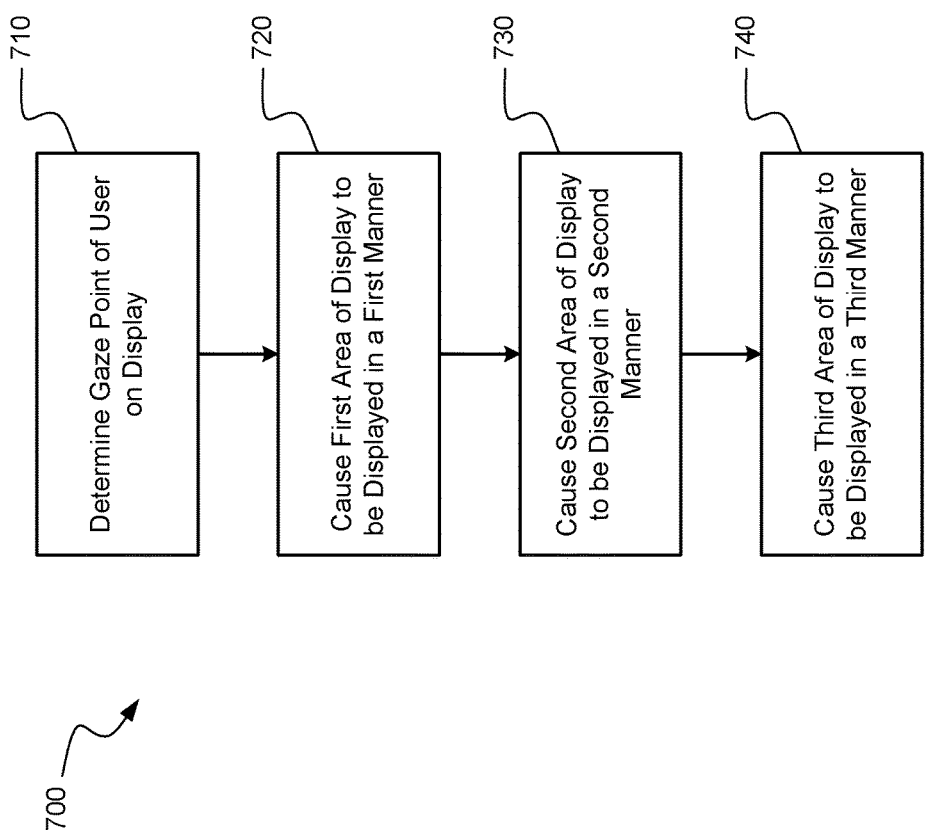
FIG. 7 is a flow diagram of another method of the invention for modifying a display device based on eye tracking.

FIG. 7 is a block diagram of another method 700 of the invention for changing content on a display based on a gaze point of a user. At block 710, the gaze point of the user on the display is determined. At block 720, a first area of the display is displayed in a first manner. The first area of the display includes the gaze point an a surrounding area. The size of the surrounding area may be adjusted based on a distance from the display to the user's eyes, as determined by the eye tracking device and/or processor.

At block 730, a second area of the display (which is different than the first area of the display) is displayed in a second manner, different than the first manner. The second manner is a manner in which the quality of rendering is lessened from the first manner. As discussed above, this could be a lower resolution and/or other quality. In some embodiments the second area could be a remainder of the display besides the first area, while in other embodiments the second area could include a portion of a horizontal axis extending to a left or a right of the gaze point, or a portion of a vertical axis extending above or below the gaze point. The second area could also or alternatively include a portion of an intermediate axis located angularly between the horizontal axis and the vertical axis.

At block 740, a third area of the display (which is different than the first area or the second area of the display) is displayed in a third manner, different than the first and second manners. The third manner is a manner in which the quality of rendering is lessened from the first manner and the second manner. As discussed above, this could be a lower resolution and/or other quality. In some embodiments the third area could be a remainder of the display besides the first area and the second area, while in other embodiments the third area could include a portion of a horizontal axis extending to a left or a right of the gaze point, or a portion of a vertical axis extending above or below the gaze point. For example, if the second area included a portion of the horizontal axis, the third area may include a portion of the vertical axis (and vice versa). The third area could also or alternatively include a portion of an intermediate axis located angularly between the horizontal axis and the vertical axis.

Figure 8:
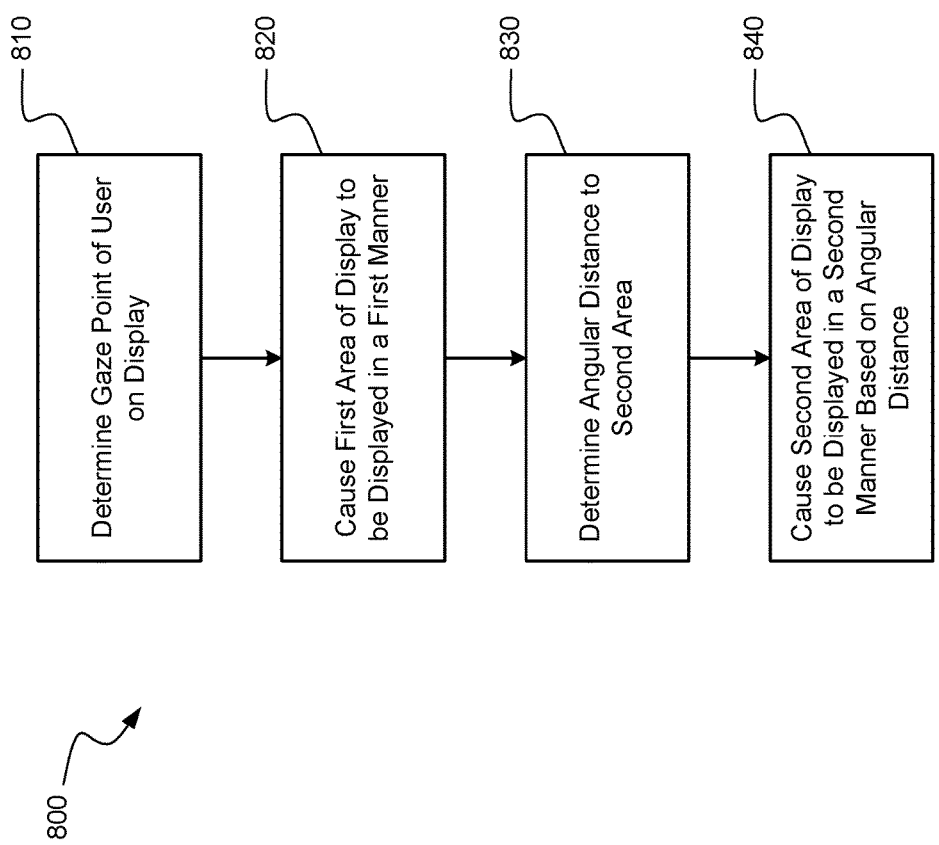
FIG. 8 is a flow diagram of another method of the invention for modifying a display device based on eye tracking.

FIG. 8 is a block diagram of another method 800 of the invention for changing content on a display based on a gaze point of a user. At block 810, the gaze point of the user on the display is determined. At block 820, a first area of the display is displayed in a first manner. The first area of the display includes the gaze point an a surrounding area. The size of the surrounding area may be adjusted based on a distance from the display to the user's eyes, as determined by the eye tracking device and/or processor.

At block 830, and angular distance from the gaze point is determined to other potential second areas of the display. If the angular distance is sufficiently large, then reduced quality rendering may be allowable without a reduction in perceived quality by the user. Thereafter, at block 840, such second area is displayed in a second manner which is based on the angular distance, and different than the first manner. The second manner is a manner in which the quality of rendering is lessened from the first manner. As discussed above, this could be a lower resolution and/or other quality. In this manner, depending on the embodiment, the angular distance from the user's eye(s) to various portions of the screen outside the first area (potentially all of the remaining area) could be analyzed to determine one or more areas which are candidates for reduced quality rendering. Minimum angular distances which may be candidates for reduced quality rendering include those areas of the display which are 20, 21, 22, 23, 24, or 25 degrees and greater from the gaze point.

Figure 9:
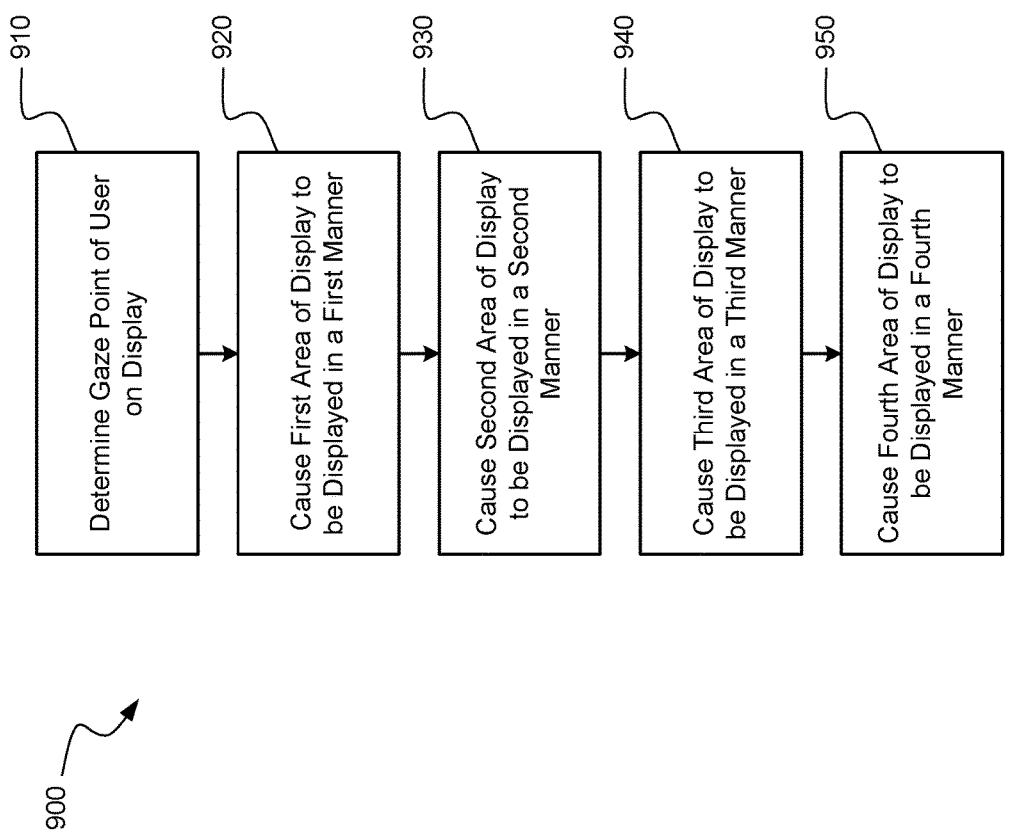
FIG. 9 is a flow diagram of another method of the invention for modifying a display device based on eye tracking.

FIG. 9 is a block diagram of another method 900 of the invention for changing content on a display based on a gaze point of a user. At block 910, the gaze point of the user on the display is determined. At block 920, a first area of the display is displayed in a first manner. The first area of the display includes the gaze point an a surrounding area. The size of the surrounding area may be adjusted based on a distance from the display to the user's eyes, as determined by the eye tracking device and/or processor.

At block 930, a second area of the display (which is different than the first area of the display) is displayed in a second manner, different than the first manner. The second manner is a manner in which the quality of rendering is lessened from the first manner. As discussed above, this could be a lower resolution and/or other quality. In some embodiments the second area could be a remainder of the display besides the first area, while in other embodiments the second area could include a portion of a horizontal axis extending to a left or a right of the gaze point, or a portion of a vertical axis extending above or below the gaze point. The second area could also or alternatively include a portion of an intermediate axis located angularly between the horizontal axis and the vertical axis.

At block 940, a third area of the display (which is different than the first area or the second area of the display) is displayed in a third manner, different than the first and second manners. The third manner is a manner in which the quality of rendering is lessened from the first manner and the second manner. As discussed above, this could be a lower resolution and/or other quality. In some embodiments the third area could be a remainder of the display besides the first area and the second area, while in other embodiments the third area could include a portion of a horizontal axis extending to a left or a right of the gaze point, or a portion of a vertical axis extending above or below the gaze point. For example, if the second area included a portion of the horizontal axis, the third area may include a portion of the vertical axis (and vice versa). The third area could also or alternatively include a portion of an intermediate axis located angularly between the horizontal axis and the vertical axis.

At block 950, a fourth area of the display (which is different than the first area, the second area, or the third area of the display) is displayed in a fourth manner, different than the first, second, and third manners. The fourth manner is a manner in which the quality of rendering is lessened from the first manner, the second manner, and the third manner. As discussed above, this could be a lower resolution and/or other quality. In some embodiments the fourth area could be a remainder of the display besides the first, second, and third areas, while in other embodiments the fourth area could include a portion of a horizontal axis extending to a left or a right of the gaze point, or a portion of a vertical axis extending above or below the gaze point. For example, if the second area included a portion of the horizontal axis, the third area may include a portion of the vertical axis (and vice versa). The fourth area could also or alternatively include a portion of an intermediate axis located angularly between the horizontal axis and the vertical axis (especially in those embodiments where the second and third areas already include such areas).

Figure 10:
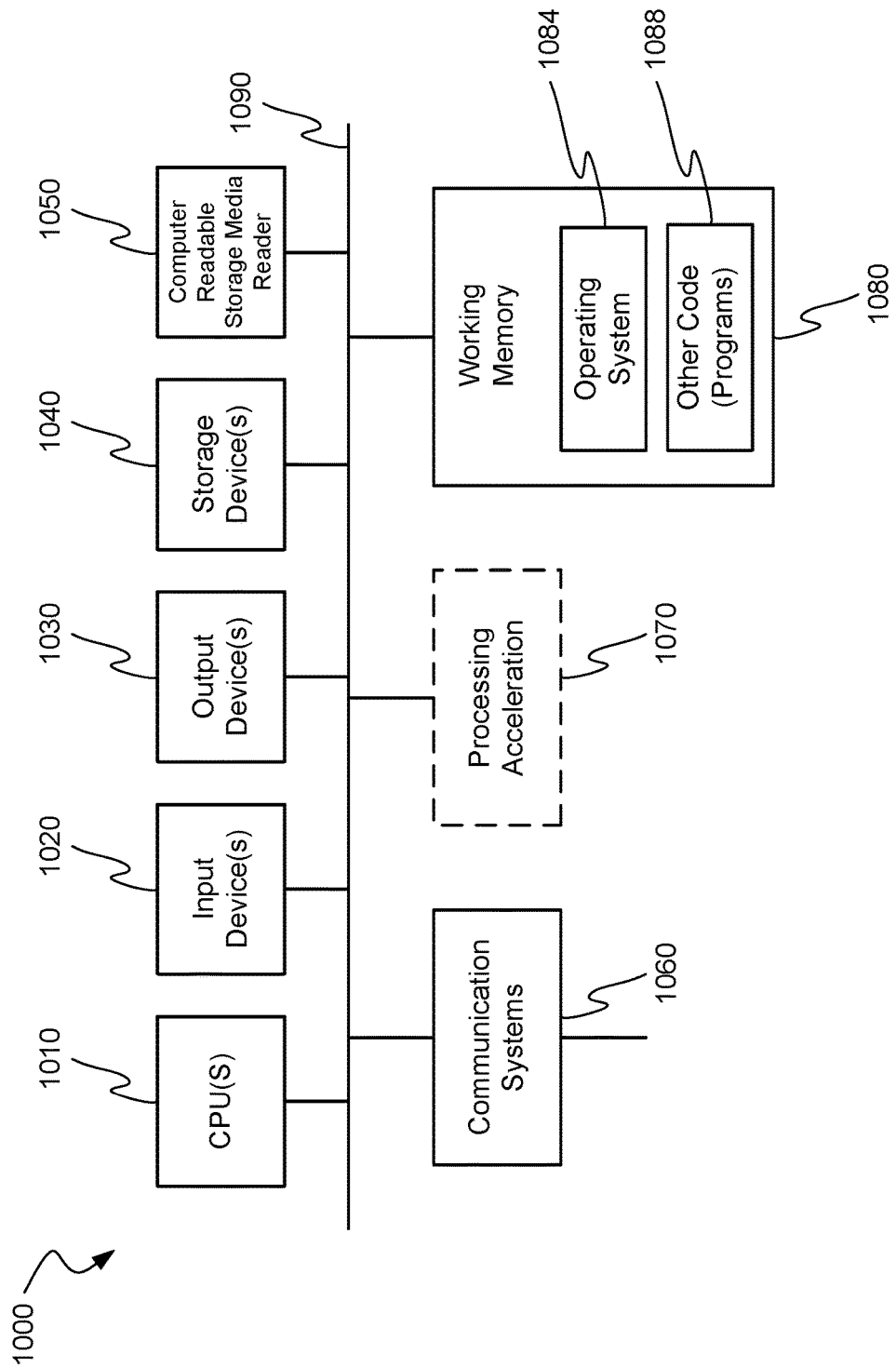
FIG. 10 is a block diagram of an exemplary computer system capable of being used in at least some portion of the apparatuses or systems of the present invention, or implementing at least some portion of the methods of the present invention.

FIG. 10 is a block diagram illustrating an exemplary computer system 1000 in which embodiments of the present invention may be implemented. This example illustrates a computer system 1000 such as may be used, in whole, in part, or with various modifications, to provide the functions of the display, the computing device, the central processing unit, the graphics processing unit, the eye tracking device, and/or other components of the invention such as those discussed above. For example, various functions of the various components of the invention may be controlled by the computer system 1000, including, merely by way of example, rendering different portions of the display, determining a gaze point, etc.

The computer system 1000 is shown comprising hardware elements that may be electrically coupled via a bus 1090. The hardware elements may include one or more central processing units 1010, one or more input devices 1020 (e.g., a mouse, a keyboard, eye tracking device, etc.), and one or more output devices 1030 (e.g., a display device, a printer, etc.). The computer system 1000 may also include one or more storage device 1040. By way of example, storage device(s) 1040 may be disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1050, a communications system 1060 (e.g., a modem, a network card (wireless or wired), an infra-red communication device, Bluetooth™ device, cellular communication device, etc.), and working memory 1080, which may include RAM and ROM devices as described above. In some embodiments, the computer system 1000 may also include a processing acceleration unit 1070, which can include a digital signal processor, a special-purpose processor and/or the like.

The computer-readable storage media reader 1050 can further be connected to a computer-readable storage medium, together (and, optionally, in combination with storage device(s) 1040) comprehensively representing remote, local, fixed, and/or removable storage devices plus storage media for temporarily and/or more permanently containing computer-readable information. The communications system 1060 may permit data to be exchanged with a network, system, computer and/or other component described above.

The computer system 1000 may also comprise software elements, shown as being currently located within a working memory 1080, including an operating system 1084 and/or other code 1088. It should be appreciated that alternate embodiments of a computer system 1000 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 1000 may include code 1088 for implementing any or all of the function of the various elements of the architecture as described herein. For example, software, stored on and/or executed by a computer system such as system 1000, can provide the functions of the display, the computing device, the central processing unit, the graphics processing unit, the eye tracking device, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for changing content on a display based on a gaze point of a user on the display, wherein the method comprises:
   determining a gaze point of a user on a display;
   causing a first area of the display to be displayed at a first resolution, the first area including the gaze point and a surrounding area;
   determining a second area of the display, wherein the second area is positioned to a left side or to a right side of the gaze point along a horizontal axis extending through the gaze point;
   causing the second area of the display to be displayed at a second resolution, wherein the second resolution is a horizontally oriented rectangular resolution;
   determining a third area of the display, wherein the third area is positioned above or below the gaze point along a vertical axis extending through the gaze point;
   causing the third area of the display to be displayed at a third resolution, wherein the third resolution is a vertically oriented rectangular resolution;
   determining a fourth area of the display, wherein the fourth area is positioned away from the gaze point along an intermediate axis extending through the gaze point between the horizontal axis and the vertical axis;
   determining an angular distance between the intermediate axis and one of the horizontal axis or the vertical axis; and
   causing the fourth area of the display to be displayed at a fourth resolution, wherein the fourth resolution is determined as a function of the angular distance and is a rectangular resolution oriented substantially parallel to the intermediate axis.

2. The method for changing content on a display based on a gaze point of a user on the display of claim 1, wherein:
   the second resolution is lower than the first resolution.

3. The method for changing content on a display based on a gaze point of a user on the display of claim 1, wherein:
   the third resolution is lower than the second resolution; and
   the second resolution is lower than the first resolution.

4. The method for changing content on a display based on a gaze point of a user on the display of claim 1, wherein the second resolution comprises:
   a plurality of virtual pixels, each virtual pixel having a greater width than height.

5. The method for changing content on a display based on a gaze point of a user on the display of claim 4, wherein each virtual pixel comprises:
   a plurality of actual pixels.

6. The method for changing content on a display based on a gaze point of a user on the display of claim 1, wherein the third resolution comprises:
   a plurality of virtual pixels, each virtual pixel having a greater height than width.

7. The method for changing content on a display based on a gaze point of a user on the display of claim 6, wherein each virtual pixel comprises:
   a plurality of actual pixels.

8. The method for changing content on a display based on a gaze point of a user on the display of claim 1, wherein:
   the second resolution is lower than the first resolution;
   the fourth resolution is lower than the second resolution; and
   the third resolution is lower than the fourth resolution.

9. The method for changing content on a display based on a gaze point of a user on the display of claim 8, wherein the fourth resolution comprises:
   a plurality of virtual pixels, each virtual pixel having a length substantially parallel to the intermediate axis, and a width substantially perpendicular to the intermediate axis, wherein each virtual pixel has a greater length than width.

10. The method of claim 1, wherein determining the angular distance comprises measuring the angular distance from the horizontal axis to the intermediate axis.

11. The method of claim 1, wherein determining the angular distance comprises determining that the angular distance between the intermediate axis and one of the horizontal or the vertical axis is at least 20 degrees.

12. A system for changing content on a display based on a gaze point of a user on the display, wherein the system comprises:
    an eye tracking device for determining a gaze point of a user on a display; and
    a processor for at least:
       causing a first area of the display to be displayed at a first resolution, the first area including the gaze point and a surrounding area;
       determining a second area of the display, wherein the second area is positioned to a left side or to a right side of the gaze point along a horizontal axis extending through the gaze point;
       causing the second area of the display to be displayed at a second resolution, wherein the second resolution is a horizontally oriented rectangular resolution;
       determining a third area of the display, wherein the third area is positioned above or below the gaze point along a vertical axis extending through the gaze point;
       causing the third area of the display to be displayed at a third resolution, wherein the third resolution is a vertically oriented rectangular resolution;
       determining a fourth area of the display, wherein the fourth area is positioned away from the gaze point along an intermediate axis extending through the gaze point between the horizontal axis and the vertical axis;
       determining an angular distance between the intermediate axis and one of the horizontal axis or the vertical axis; and
       causing the fourth area of the display to be displayed at a fourth resolution, wherein the fourth resolution is determined as a function of the angular distance and is a rectangular resolution oriented substantially parallel to the intermediate axis.

13. The system for changing content on a display based on a gaze point of a user on the display of claim 12, wherein determining the angular distance comprises measuring the angular distance from the horizontal axis to the intermediate axis.

14. The system for changing content on a display based on a gaze point of a user on the display of claim 12, wherein determining the angular distance comprises determining that the angular distance between the intermediate axis and one of the horizontal or the vertical axis is at least 20 degrees.

15. The system for changing content on a display based on a gaze point of a user on the display of claim 12, wherein the fourth resolution comprises:
    a plurality of virtual pixels, each virtual pixel having a length substantially parallel to the intermediate axis, and a width substantially perpendicular to the intermediate axis, wherein each virtual pixel has a greater length than width.

16. A non-transitory machine readable medium having instructions stored thereon for changing content on a display based on a gaze point of a user on the display, wherein the instructions are executable by one or more processors to at least:
- determine a gaze point of a user on a display;
- cause a first area of the display to be displayed at a first resolution, the first area including the gaze point and a surrounding area;
- determine a second area of the display, wherein the second area is positioned to a left side or to a right side of the gaze point along a horizontal axis extending through the gaze point;
- cause the second area of the display to be displayed at a second resolution, wherein the second resolution is a horizontally oriented rectangular resolution;
- determine a third area of the display, wherein the third area is positioned above or below the gaze point along a vertical axis extending through the gaze point;
- cause the third area of the display to be displayed at a third resolution, wherein the third resolution is a vertically oriented rectangular resolution;
- determine a fourth area of the display, wherein the fourth area is positioned away from the gaze point along an intermediate axis extending through the gaze point between the horizontal axis and the vertical axis;
- determine an angular distance between the intermediate axis and one of the horizontal axis or the vertical axis; and
- cause the fourth area of the display to be displayed at a fourth resolution, wherein the fourth resolution is determined as a function of the angular distance and is a rectangular resolution oriented substantially parallel to the intermediate axis.

17. The non-transitory machine readable medium having instructions stored thereon for changing content on a display based on a gaze point of a user on the display of claim 16, wherein determining the angular distance comprises measuring the angular distance from the horizontal axis to the intermediate axis.

18. The non-transitory machine readable medium having instructions stored thereon for changing content on a display based on a gaze point of a user on the display of claim 16, wherein the fourth resolution comprises:
- a plurality of virtual pixels, each virtual pixel having a length substantially parallel to the intermediate axis, and a width substantially perpendicular to the intermediate axis, wherein each virtual pixel has a greater length than width.

* * * * *